United States Patent
Baillard et al.

(10) Patent No.: US 11,263,816 B2
(45) Date of Patent: Mar. 1, 2022

(54) METHOD AND DEVICE FOR A PLACEMENT OF A VIRTUAL OBJECT OF AN AUGMENTED OR MIXED REALITY APPLICATION IN A REAL-WORLD 3D ENVIRONMENT

(71) Applicant: INTERDIGITAL CE PATENT HOLDINGS, Paris (FR)

(72) Inventors: Caroline Baillard, Saint Sulpice la Foret (FR); Pierrick Jouet, Rennes (FR); Matthieu Fradet, Chanteloup (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 132 days.

(21) Appl. No.: 16/470,198

(22) PCT Filed: Nov. 29, 2017

(86) PCT No.: PCT/EP2017/080852
§ 371 (c)(1),
(2) Date: Jun. 14, 2019

(87) PCT Pub. No.: WO2018/108536
PCT Pub. Date: Jun. 21, 2018

(65) Prior Publication Data
US 2020/0394842 A1    Dec. 17, 2020

(30) Foreign Application Priority Data

Dec. 15, 2016   (EP) ..................................... 16306684

(51) Int. Cl.
*G06T 19/00* (2011.01)
*G06T 19/20* (2011.01)

(52) U.S. Cl.
CPC ............ *G06T 19/006* (2013.01); *G06T 19/20* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 7,680,336 | B2 | 3/2010 | Endo et al. |
| 8,681,146 | B2 | 3/2014 | Bell et al. |

(Continued)

FOREIGN PATENT DOCUMENTS

WO    WO2006074100    7/2006

OTHER PUBLICATIONS

Breen et al., "Interactive Occlusion and Automatic Object Placement for Augmented Reality", Computer Graphics Forum, vol. 15, No. 3, Aug. 1996, pp. 11-22.

(Continued)

*Primary Examiner* — Martin Mushambo
(74) *Attorney, Agent, or Firm* — Invention Mine LLC (57) ABSTRACT

A method for a placement of a virtual object of an augmented or mixed reality application in a real-world 3D environment, comprises: selecting (14), at a runtime of the augmented or mixed reality application, one of a finite set of at least two candidate insertion areas predetermined in the real-world 3D environment for the placement of the virtual object in the real-world 3D environment, based on criteria combining, for each of the candidate insertion areas, relationships between each of: the real-world 3D environment, the virtual object considered with respect to a placement of that virtual object in that candidate insertion area, and a user position; and inserting (14) the virtual object in the selected candidate insertion area.

16 Claims, 7 Drawing Sheets

(56) References Cited

U.S. PATENT DOCUMENTS

| | | | |
|---|---|---|---|
| 8,791,960 B2 | 7/2014 | Yoon et al. | |
| 9,261,954 B2 | 2/2016 | Tsurumi | |
| 10,445,942 B1* | 10/2019 | Pekelny | G06F 3/011 |
| 10,762,716 B1* | 9/2020 | Paul | G06F 3/04842 |
| 10,867,080 B2* | 12/2020 | Jovanovic | G06F 30/13 |
| 2003/0020707 A1* | 1/2003 | Kangas | G06F 3/011 |
| | | | 345/418 |
| 2003/0179218 A1* | 9/2003 | Martins | G06T 19/00 |
| | | | 345/633 |
| 2006/0155615 A1* | 7/2006 | Loo | G06Q 30/0207 |
| | | | 705/26.1 |
| 2006/0209085 A1* | 9/2006 | Wong | G09G 5/00 |
| | | | 345/629 |
| 2008/0150965 A1* | 6/2008 | Bischoff | G06T 7/70 |
| | | | 345/632 |
| 2010/0103196 A1 | 4/2010 | Kumar et al. | |
| 2013/0121531 A1* | 5/2013 | Lefevre | G06T 7/20 |
| | | | 382/103 |
| 2013/0257907 A1* | 10/2013 | Matsui | G09G 5/377 |
| | | | 345/633 |
| 2013/0271625 A1 | 10/2013 | Gruber et al. | |
| 2014/0240552 A1 | 8/2014 | Kasahara | |
| 2014/0368534 A1 | 12/2014 | Salter et al. | |
| 2014/0380355 A1* | 12/2014 | Hellier | H04N 21/845 |
| | | | 725/32 |
| 2015/0221133 A1* | 8/2015 | Groten | G06T 11/00 |
| | | | 345/633 |
| 2016/0210780 A1 | 7/2016 | Paulovich et al. | |
| 2016/0210784 A1 | 7/2016 | Ramsby et al. | |
| 2016/0246384 A1* | 8/2016 | Mullins | G06F 3/011 |
| 2017/0256096 A1* | 9/2017 | Faaborg | G06T 19/20 |
| 2017/0367766 A1* | 12/2017 | Mahfouz | A61B 17/1703 |
| 2018/0136815 A1* | 5/2018 | Tomizuka | G06F 3/04815 |
| 2018/0190022 A1* | 7/2018 | Zamir | G06T 19/006 |
| 2018/0246631 A1* | 8/2018 | Maruyama | H04N 13/282 |
| 2018/0339223 A1* | 11/2018 | Haas | A63F 13/25 |
| 2018/0350144 A1* | 12/2018 | Rathod | G06Q 20/3276 |
| 2019/0099675 A1* | 4/2019 | Khan | A63F 13/212 |
| 2019/0278621 A1* | 9/2019 | Thomas | G06K 9/00335 |
| 2019/0287307 A1* | 9/2019 | Rogers | G06T 19/006 |
| 2019/0287308 A1* | 9/2019 | Luo | G06T 19/006 |
| 2020/0363924 A1* | 11/2020 | Flexman | G06F 3/011 |

OTHER PUBLICATIONS

Cant et al., "Methods for Automated Object Placement in Virtual Scenes", 11th International Conference on Computer Modelling And Simulation (UKSim '09), Cambridge University, Emmanuel College, Cambridge UK, Mar. 25, 2009, pp. 431-436.

Xu et al., "Constraint-Based Automatic Placement For Scene Composition", Graphics Interface 2002, Calgary, Alberta, Canada, May 27, 2002, pp. 25-34.

* cited by examiner

METHOD AND DEVICE FOR A PLACEMENT OF A VIRTUAL OBJECT OF AN AUGMENTED OR MIXED REALITY APPLICATION IN A REAL-WORLD 3D ENVIRONMENT

This application claims the benefit under 35 U.S.C. § 365 of International Application PCT/EP2017/080852, filed Nov. 29, 2017, which was published in accordance with PCT Article 21(2) on Jun. 21, 2018, in English, and which claims the benefit of European Patent Application No. 16306684.8, filed Dec. 15, 2016.

1. TECHNICAL FIELD

The field of the disclosure is that of Augmented Reality (AR) and Mixed Reality (MR). More specifically, the present invention relates to a solution (method and device) for a placement of a virtual object of an augmented or mixed reality application in a real-world 3D environment.

2. TECHNOLOGICAL BACKGROUND

Augmented Reality (AR) applications refer to a live view of a real-world environment whose elements are augmented by computer-generated (CG) content, such as video or graphics. In Mixed Reality (MR), the CG content is not just overlaid on the top of the view of the real world, but it really interacts with the real-world environment, and digital and physical realities seamlessly blended together.

In AR or MR applications, the visual CG content is inserted in the real-world 3D environment at a given location. This location is generally:
  either defined relatively to a predefined visual 2D/3D pattern (e.g. industrial applications), pre-determined by spatial coordinates (e.g. outdoor location-based applications) or screen coordinates (e.g. Google Glass™ applications),
  or manually chosen by the user (e.g. interactive applications).

The scale of the CG content can be predetermined or defined with respect to the size of the visual pattern.

However, in AR or MR applications taking place in an uncontrolled complex real-world 3D environment, the optimal location and scale depends on the real-world environment and cannot be fully specified in advance. For instance, for inserting virtual objects in Mixed Reality in a user's living room, it is necessary to understand and analyze the layout of the real scene, but also its radiometry, the geometry and appearance of the virtual objects, the user position, and the purpose of the application itself. In fact, the optimal placement of the virtual objects depends on complementary rules and constraints that refer to the CG content (i.e. the virtual objects), to the real-world environment and to the application.

A known solution is to use feature detection or object recognition techniques to specify relevant locations for insertion. In an alternative known solution, Microsoft Hololens™ glasses use the concept of anchor points, which can be selected by the user or automatically positioned using image analysis techniques. In another alternative known solution, described in patent U.S. 2016/0210784, a controller adjusts the location and scale of the virtual object for it to have an overlap with the field of view of the user.

However these known solutions do not take into account all the constraints together, and there is no guarantee that the location for insertion of the virtual object is the best one for the user.

Another solution is described by A. E. Breen et al. in "Interactive Occlusion and Automatic Object Placement for Augmented Reality", *Computer Graphics Forum*, Wiley-Blackwell Publishing LTD, Vol. 15, no. 3, 1996. According to it, virtual objets are automatically moved from an initial position until they come in contact with static real objects in AR, calibrated data derived from images of a real-world environment being used and a collision detection algorithm enabling to carry out an automatic object placement of the virtual objects with respect to the static real objects. In implementations, virtual objects are incrementally moved (in transaltion and in rotation) in the direction of a "gravity" vector arbitrarily defined by a user until a collision is detected, for example with a real table, a real floor or a real wall.

Though attractive for achieving realistic AR representations, that solution may prove not sufficient in a number of circumstances. As it is an incremental approach, it requires an initial position that is provided by the user. There is no solution for automatically finding a valid initial position, hence for automatizing the process. Even if it could be automatized, it does not take into account the neighboring objects or the sscaling parameters, and it may prove inappropriate for example when the virtual object is too big for a table or appears awkward with respect to other parts of the AR scene when attached to a wall. Otherwise, the user needs to make decisions, regarding notably the choice of the "gravity" vector. Also, the place where the virtual object is arranged may not be optimal and merely correspond to the first occurred collision. In addition, incremently determining the appropriate positioning and orientation of the virtual object may sometimes require significant and unpredictable computational costs, prejudicial to real-time applications.

In patent application WO 2006/074100 to Wild-Tangent, a system is disclosed for measuring efficacy of an object placed in a virtual multi-dimensional environment, which is suited to commercial communication such as e.g. advertising. The disclosure is focused on appropriate related metrics, whatever the kind of object to be included in the multidimensional environment such as audio, video, texts and graphics. Various evaluation criteria are thus developed, enabling best placements of the object based on relative value and/or impact comparisons.

Though providing interesting tools, that system leaves fully open the field of potentialities for object placements. In this respect, it looks adapted to appropriate choices of relevant advertisement locations in virtual scenes by operators of commercial communication, rather than to automatic placement determination in AR or MR applications, let alone in real-time.

3. SUMMARY

The present disclosure is notably directed to a potentially efficient and automatic placement of a virtual object of an AR or MR application in a real-world 3D environment, which advantageously enables to take into account the user perception as well as the content of the real-world 3D environment, while making possible real-time execution.

The present disclosure is also notably directed to a placement of a virtual object of an AR or MR application in a real-world 3D environment, which can advantageously allow to overcome the above-cited drawbacks of the prior art solutions.

A particular aspect of the present disclosure relates to a method for a placement of a virtual object of an augmented or mixed reality application in a real-world 3D environment, the method comprising:

selecting, at a runtime of the augmented or mixed reality application, one of a finite set of at least two candidate insertion areas predetermined in the real-world 3D environment for the placement of that virtual object in the real-world 3D environment, based on criteria combining, for each of the candidate insertion areas, relationships between each of:
the real-world 3D environment,
the virtual object considered with respect to a placement of that virtual object in that candidate insertion area, and
a user position; and
inserting the virtual object in the selected candidate insertion area.

The general principle of the proposed solution is to automatically determine the optimal placement and possibly scaling of a virtual object to be inserted in a real-world 3D environment in Augmented Reality or Mixed Reality, taking simultaneously into account several complementary criteria. These criteria are based on the characteristics of the real-world 3D environment (e.g. computed on-site before the experience), on the characteristics of the virtual object (e.g. pre-determined by the content provider) and on the user position (e.g. computed on-line during the experience). The whole computation is for example performed by a rendering device, or sent by a rendering device to a processing unit. The virtual object can be a static object or a predefined animation (no physical engine involved).

The fact that the candidate insertion areas are "predetermined" means that they are already determined before executing the two steps above of selecting and of inserting. According to a particular feature, the candidate insertion areas are available before the runtime.

Thus, in the case of a static real-world 3D environment, it is allowed to reduce the computing resources (e.g. computing time) during runtime. In a particular embodiment, the method comprises determining the candidate insertion areas before the runtime. In an alternative embodiment, in the case of a dynamic real-world 3D environment, the next selection of a candidate area for a next insertion is anticipated during the runtime.

The virtual object is considered as part of the combined criteria specifically "with respect to a placement of that virtual object in that candidate insertion area", and not as such and independently from the placement of the virtual object in that candidate insertion area. Namely, it is taken account of its placement, e.g. with respect to scaling, distance to user, relationship with elements of the real-world scene and/or with other virtual objects placed or to be placed in the AR or MR scene. Otherwise said, the consideration of the virtual object is made "in concreto" in the AR or MR scene, and not "in abstracto" independently from that scene.

The predetermination of the candidate insertion areas can advantageously provide a very powerful tool for appropriate selection of a best-suited placement of the virtual object at the runtime as recited above. This contrasts with the previously mentioned prior art solutions, through significantly and purposely reducing the operational leeway at the runtime in placing the virtual object.

Advantageously, the number of the predetermined candidate insertion areas is comprised between 2 and 20, and still more advantageously between 3 and 10.

According to a particular feature, the method comprises:
retrieving the candidate insertion areas from at least one storage unit; and
outputting data on said inserting of the virtual object in the real-world environment for display,
and said selecting of said one of the candidate insertion areas and said inserting of the virtual object are carried out by at least one processor.

According to a particular feature, each of the candidate insertion areas is associated with at least one insertion point. Said selecting of said one of the candidate insertion areas comprises selecting one of the insertion points of the candidate insertion areas. Said inserting of the virtual object comprises inserting the virtual object at the selected insertion point in the selected candidate insertion area.

Thus the insertion is carried out at the best insertion point.

According to a particular feature, the method comprises, before the runtime, producing at least one of said criteria, relating to a geometric compatibility between the virtual object and the candidate insertion areas.

This pre-computing allows to reduce the computing resources (e.g. computing time) during runtime.

According to a particular feature, the criteria include: for each of the candidate insertion areas, a matching scale of the virtual object in that candidate insertion area.

In a particular embodiment, said inserting of the virtual object comprises applying to the virtual object the matching scale associated with that virtual object in the selected candidate insertion area.

According to a particular feature, each of the candidate insertion areas is associated with at least one insertion point, and the criteria include at least one of:

for the or each insertion point of each of the candidate insertion areas, at least one distance between that insertion point and a region of interest in the real-world 3D environment; and
for the or each insertion point of each of the candidate insertion areas, at least one distance between the insertion point and another virtual object already present in the real-world 3D environment.

According to a particular feature, each of the candidate insertion areas is associated with at least one insertion point, and the criteria include:

for the or each insertion point of each of the candidate insertion areas, a distance between the insertion point and the user position.

According to a particular feature, the criteria include: for each of the candidate insertion areas, an overlap of the virtual object with respect to a current user field of view.

According to a particular feature, the criteria include: for each of the candidate insertion areas, a size of the virtual object once rendered in the candidate insertion area, as derived from a maximum scaling of the virtual object in the candidate insertion area and from a distance between the user position and the virtual object as scaled in the candidate insertion area.

According to a particular feature, each of the candidate insertion areas is associated with at least one insertion point, and the criteria include at least one of:

for the or each insertion point of each of the candidate insertion areas, a visibility from the user position of at least one region of interest after insertion of the virtual object in the candidate insertion area at the insertion point; and
for the or each insertion point of each of the candidate insertion areas, a visibility from the user position of the virtual object after being inserted in the candidate insertion area at the insertion point.

According to a particular feature, the criteria include: for the or each insertion point of each of the candidate insertion areas, a radiometry of a background as observed from the user position after insertion of the virtual object in the candidate insertion area at the insertion point.

According to a particular feature, said selecting and said inserting are executed for at least one further virtual object, in parallel with the execution for the virtual object at the runtime.

Another aspect of the present disclosure relates to a computer program product comprising program code instructions for implementing the above-mentioned method (for a placement of a virtual object of an augmented or mixed reality application in a real-world 3D environment), in any of its different embodiments, when that program is executed on a computer or a processor.

Another aspect of the present disclosure relates to a non-transitory computer-readable carrier medium, storing the aforesaid computer program product.

Another aspect of the present disclosure relates to a device for a placement of a virtual object of an augmented or mixed reality application in a real-world 3D environment, that device comprising a computation machine configured to:
- select, at a runtime of the augmented or mixed reality application, one of a finite set of at least two candidate insertion areas predetermined in the real-world 3D environment for the placement of that virtual object in the real-world 3D environment, based on criteria combining, for each of the candidate insertion areas, relationships between each of:
  - said real-world 3D environment,
  - said virtual object considered with respect to a placement of the virtual object in that candidate insertion area, and
  - a user position; and
- insert said virtual object in the selected candidate insertion area.

According to a particular feature of the device, the computation machine is further configured to execute a method (for a placement of a virtual object of an augmented or mixed reality application in a real-world 3D environment) compliant with any of the above-mentioned embodiments.

The device can be implemented in an apparatus chosen e.g. among a mobile phone, a tablet and a head-mounted display.

Another aspect of the present disclosure relates to a device for a placement of a virtual object of an augmented or mixed reality application in a real-world 3D environment, that device comprising:
- selecting means, configured to select, at a runtime of the augmented or mixed reality application, one of a finite set of at least two candidate insertion areas determined in the real-world 3D environment for the placement of that virtual object in the real-world 3D environment, based on criteria combining, for each of the candidate insertion areas, relationships between:
  - the real-world 3D environment,
  - the virtual object considered with respect to a placement of that virtual object in that candidate insertion area, and
  - a user position; and
- inserting means, configured to insert the virtual object in the selected candidate insertion area.

The device for a placement of a virtual object is advantageously configured for carrying out any execution mode of the method above for a placement of a virtual object.

4. LIST OF FIGURES

Other features and advantages of embodiments shall appear from the following description, given by way of indicative and non-exhaustive examples and from the appended drawings, of which.

5. DETAILED DESCRIPTION

In all of the figures of the present document, similar elements and steps are designated by the same numerical reference sign.

Figure 1:
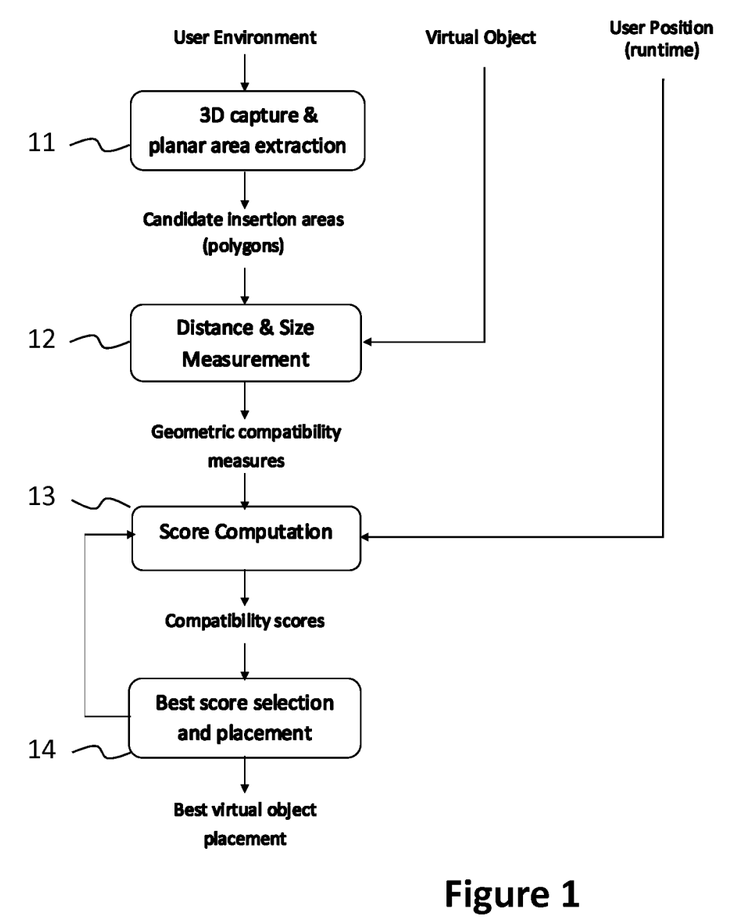
FIG. 1 is a flowchart of a particular embodiment of the proposed method.

FIG. 1 is a flowchart of a particular embodiment of the proposed method for an automatic placement of a virtual object of an AR (augmented reality) or MR (mixed reality) application in a real-world 3D environment. In this particular embodiment, the method comprises four consecutive steps 11 to 14.

In a particular implementation, described below, the method is carried out by a rendering device (e.g. a smartphone, a tablet or a head-mounted display). In an alternative implementation, the method is carried out by a computing device external to the rendering device. In the latter case, the results of the whole computation is transmitted by the computing device to the rendering device.

Figure 2:
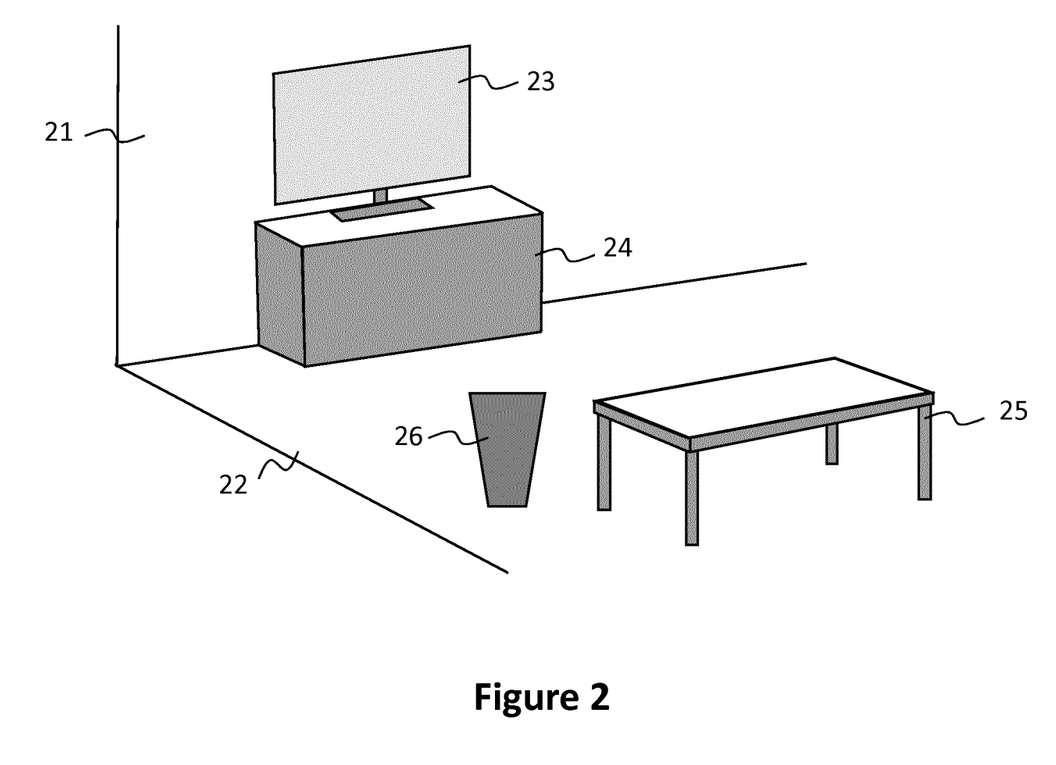
FIG. 2 shows an example of a real-world 3D environment.

An example of a real-world 3D environment is shown in FIG. 2. It comprises a wall 21, a ground 22, a TV 23, a TV bench 24, a table 25 and a vase 26.

Figure 7:
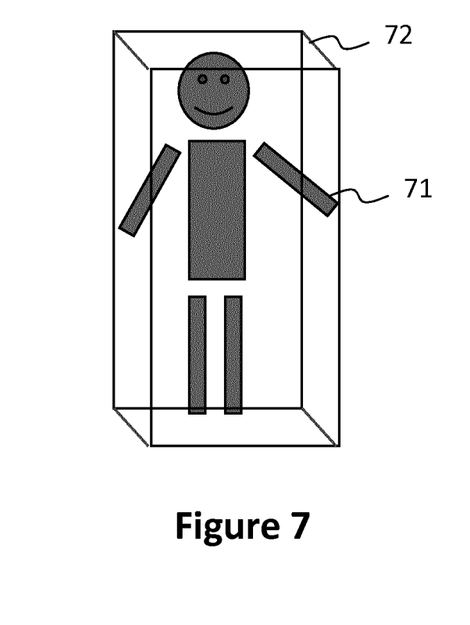
FIG. 7 shows an example of a virtual object to be inserted, and corresponding occupancy volume.

The virtual object is a predefined animation (i.e. the occupancy volume of the animation is pre-determined and does not depend on the environment) or a static object. In the example described below, the virtual object is the predefined animation 71 shown in FIG. 7, with an occupancy volume 72.

The virtual object is for example associated with the following parameters for optimal rendering (pre-determined during authoring):
- min and max scale (referred to as "minScale" and "maxScale");
- orientation range (the orientation can be predefined, related to another object, related to the user, or arbitrary);
- total occupancy volume at scale 1;
- flag indicating the vertical or horizontal orientation of the insertion areas.

The AR or MR application can involve several virtual objects to be inserted, as long as their placement can be separately optimized.

In the following description, it is assumed that we have access to depth data. Ideally, the rendering device is able to capture depth data (using Google Tango™ technology or Microsoft Hololens™ for instance). If this is not the case, the real environment can be previously scanned using a depth camera (Intel RealSense™ depth camera for instance), but the scene must then be static.

Step 11. Pre-processing: real scene analysis and determination of candidate insertion areas.

A set of candidate insertion areas is first predefined using standard 3D-based scene analysis techniques. In other words, the candidate insertion areas are available before the runtime of the AR or MR application. During runtime, they are e.g. retrieved from at least one storage unit.

The real scene is scanned using the depth sensor and candidate insertion areas are identified. Without much loss of generality, the insertion areas are constrained to be horizontal or vertical planar areas.

In a particular embodiment, step 11 comprises:
capturing a 3D point cloud describing the real scene;
extracting all vertical and horizontal planar areas (standard method, e.g. using Hough transform or normal analysis);
delineating every planar area (e.g. using Delaunay triangulation with threshold on edge length);
filtering out small areas.

The output of this step 11 is a set of delineated planar regions defining the candidate insertion areas.

Figure 3:
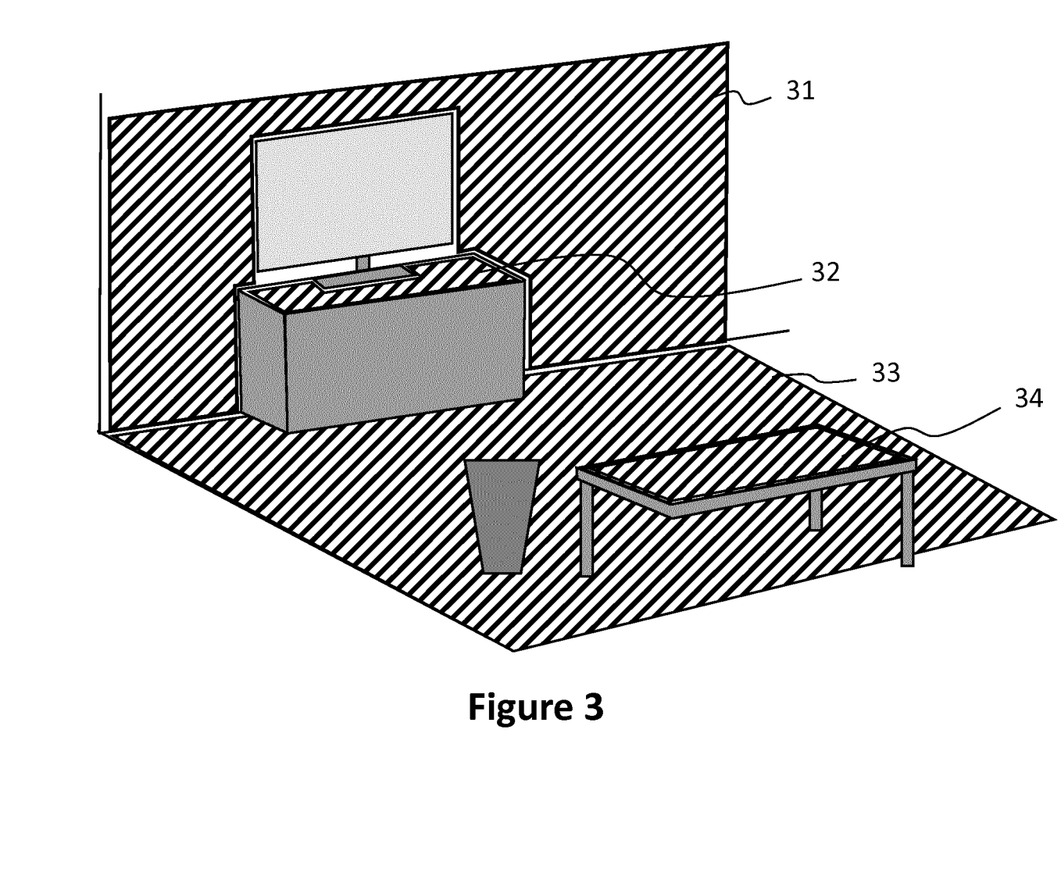
FIG. 3 illustrates the output of step 11 of FIG. 1, with the environment of FIG. 2.

FIG. 3 illustrates the output of step 11, with the environment of FIG. 2. There are four candidate insertion areas: hatched areas 31 to 34 corresponding to the wall, the TV bench, the ground and the table respectively. Step 12. Characterize the geometric compatibility between candidate insertion areas and virtual object.

In order to reduce the computing time during runtime, it is possible to pre-compute some measures that characterize the geometric compatibility between the candidate insertion areas and the virtual object, before actually running the AR or MR application. These measures are only based on the virtual object layout, and they do not take into account the user position at the moment of insertion.

During this computation step, a single insertion point or a list of several ("best") insertion points is also determined for each candidate insertion area. In a particular embodiment, for each candidate insertion area, the single or each insertion point is predetermined. For example, for a candidate insertion area having a compact and symmetrical shape such as a regular circle or polygon, the center can be chosen as insertion point. For an irregular shape, a possible implementation is to choose several insertions points (e.g. five) which are distributed in a regular or random manner in the candidate insertion area. In an alternative implementation, a geodetic distance map is precomputed (only once) for each candidate insertion area (each point of the area has a value, zero on the edges, and which increases when moving away from the edges, the maximum being reached at the geodetic center of the zone), and the insertion points are sampled with a sampling function favoring high distances.

In another embodiment, the insertion points are not predetermined nor pre-computed during step 12, but are computed automatically during runtime of the AR or MR application (i.e. during step 13 described below). This means that the measures requiring the knowledge of the insertion points (e.g. distances between the insertion points and predefined regions of interest, and distances from the insertion points to other virtual objects) are carried out in step 13 instead of step 12.

When the application is launched, the rendering device can access the occupancy volume of the virtual object to be inserted (simplified proxy of the object or simple bounding shape containing the whole animation), as well as the occupancy polygon (intersection of the occupancy volume with the contact plane). If the occupancy volume is not explicitly provided, it can be computed by the rendering device, at launch.

Then, for every candidate insertion area, the rendering device computes the following measures in a particular embodiment:

maximal size that the virtual object can reach inside the candidate insertion area:
use the occupancy polygon to determine at what scale the virtual object fits inside the candidate insertion area;
check that the occupancy volume does not intersect the 3D point cloud describing the real scene;
store the corresponding insertion point(s) and scale (referred to as "matchScale", with: minScale<=matchScale<=maxScale, where "minScale" and "maxScale" are the minimal and maximal scale values associated with the virtual object).

for each insertion point, and for at least one predefined region of interest (ROI) in the real-world 3D environment (for instance a visual marker, an object related to the application (TV, sofa . . . ), etc.), a distance between the insertion point and the predefined region of interest;

for each insertion point, and for at least one other virtual object already present in the real-world 3D environment, a distance from the insertion point to the other virtual object.

According to the available computing power, several methods can be used to determine the maximal size of the occupancy polygon:

method no. 1: compare the disk inscribed in the candidate insertion area and the bounding circle of the occupancy polygon. This method no. 1 is very quick but not optimal, especially if the occupancy polygon has an elongated shape;

method no. 2: use method no. 1 to initialize the scale. Then increase the scale and check inclusion using inclusion tests between polygons. According to orientation range of the input virtual object, test different orientation values to find the best one (leading to the maximal scale). This method no. 2 is slower but accurate for any shape;

intermediate method: use a compacity measure to decide whether to approximate the polygons with circles or not.

In an embodiment, it is possible to store several insertions points for a same candidate insertion area, each insertion point being associated with its own scale ("matchScale") and distance measures.

Figure 4:
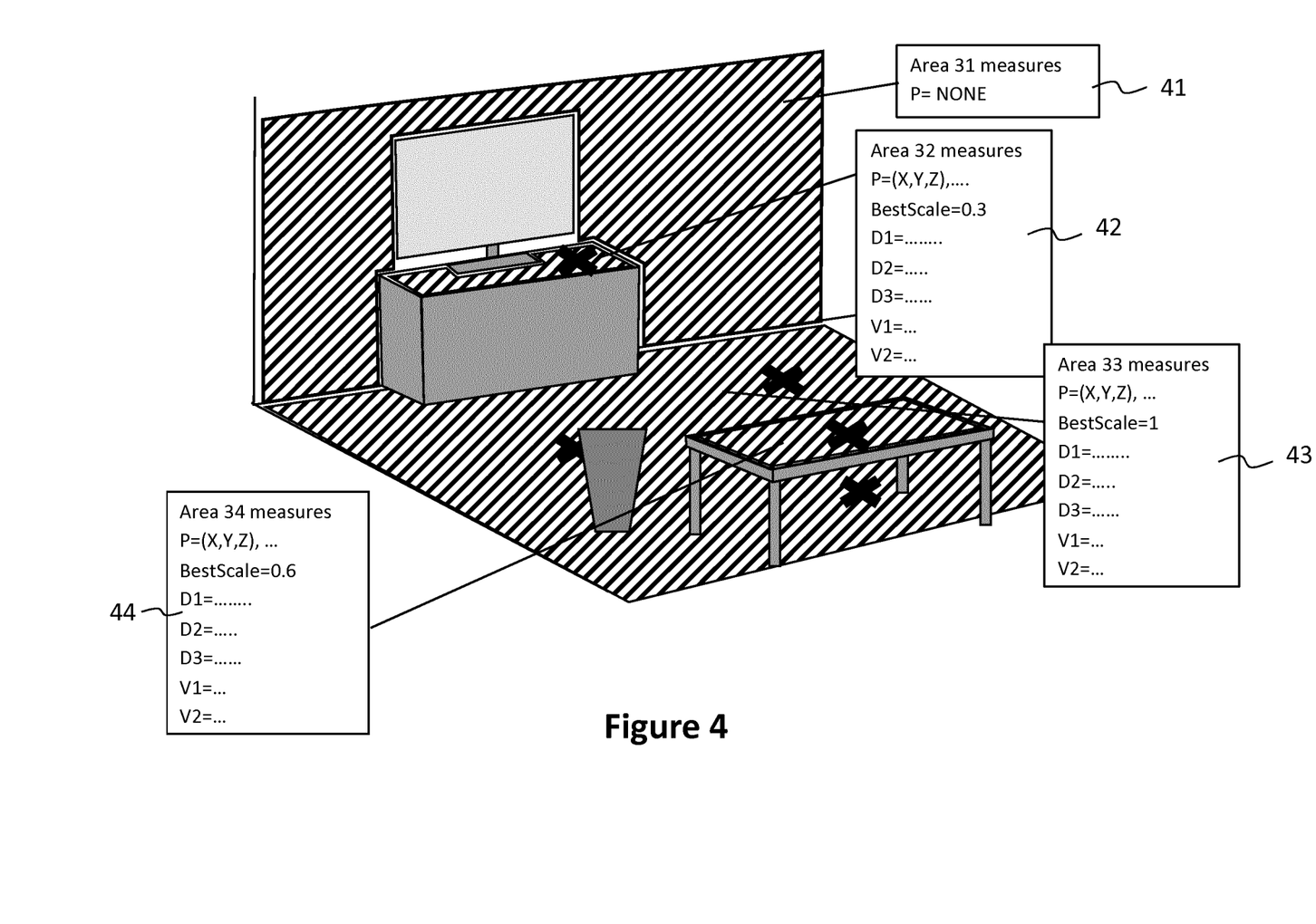
FIG. 4 illustrates the output of step 12 of FIG. 1, with the environment of FIG. 2.

FIG. 4 illustrates the output of step 12, with the environment of FIG. 2. The candidate insertion areas (31 to 34 in FIG. 3) are associated with virtual object-dependent measures 41 to 44 depending on the user environment and the virtual object. For each candidate insertion area, the measures include a list of best insertion points ("P= (X,Y,Z), . . . ") (some examples are given by the black crosses), the corresponding best scale ("BestScale= . . . "), and various distance and size measures ("D1= . . . , D2= . . . , etc.") characterizing the relation between the real-world 3D environment and the virtual object. For instance, area 31 does not have any acceptable insertion point because it is a vertical area which is not compatible with the virtual object requirement. Area 32 and area 34 have a "best scale" inferior to 1 because they are smaller than the virtual object to be inserted. Note, area 33 is associated with three insertion points (one of them being partially hidden behind the vase 26, and the other being located below the table 24) because at this stage the user position has not been taken into account.

Step 13. Compute matching scores based on user position.

During runtime of the AR or MR application, whenever a new virtual object must be inserted, a matching score is computed for every candidate insertion point of this virtual object, with respect to the user position at the moment of the insertion. The matching score is defined as a weighted sum of virtual object-dependent and user-dependent individual scores. Every parameter is associated with an individual score using a normalized function varying between 0 and 1. The weights are for example set during content authoring according to the application purpose, but they can also have default values, or be personalized or adjusted by the user.

In a particular embodiment, the individual scores are obtained using a normalized function varying between 0 and 1, applied to the following parameters (non-exhaustive list) for each insertion point of each candidate insertion area:

pre-computed geometric measures (see output of step 12):
  match scale;
  for at least one predefined region of interest (ROI) in the real-world 3D environment, a distance between the insertion point and the predefined region of interest (ROI);
  for at least one other virtual object already present in the real-world 3D environment, a distance from the insertion point and the other virtual object;
user-dependent measures (not computed in step 12):
  user distance (i.e. the distance between the insertion point and the user);
  an overlap of the virtual object with respect to a current user field of view (i.e.: is the virtual object inserted in the field of view of the user?);
  size of the rendered region (i.e. size in pixels of the virtual object once rendered in the candidate insertion area, as opposed to a 3D size computed during preprocessing), derived from "maxScale" and the user distance;
  visibility (from the user position) of the virtual object after being inserted in the candidate insertion area at the insertion point (e.g. use of a zbuffer);
  visibility (from the user position) of ROI(s) after insertion of the virtual object in the candidate insertion area at the insertion point;
  radiometry of a background as observed from the user position after insertion of the virtual object in the candidate insertion area at the insertion point.

The output of step 13 is e.g. a list of insertion points (at least one for each candidate insertion area) with decreasing matching scores.

Figure 5:
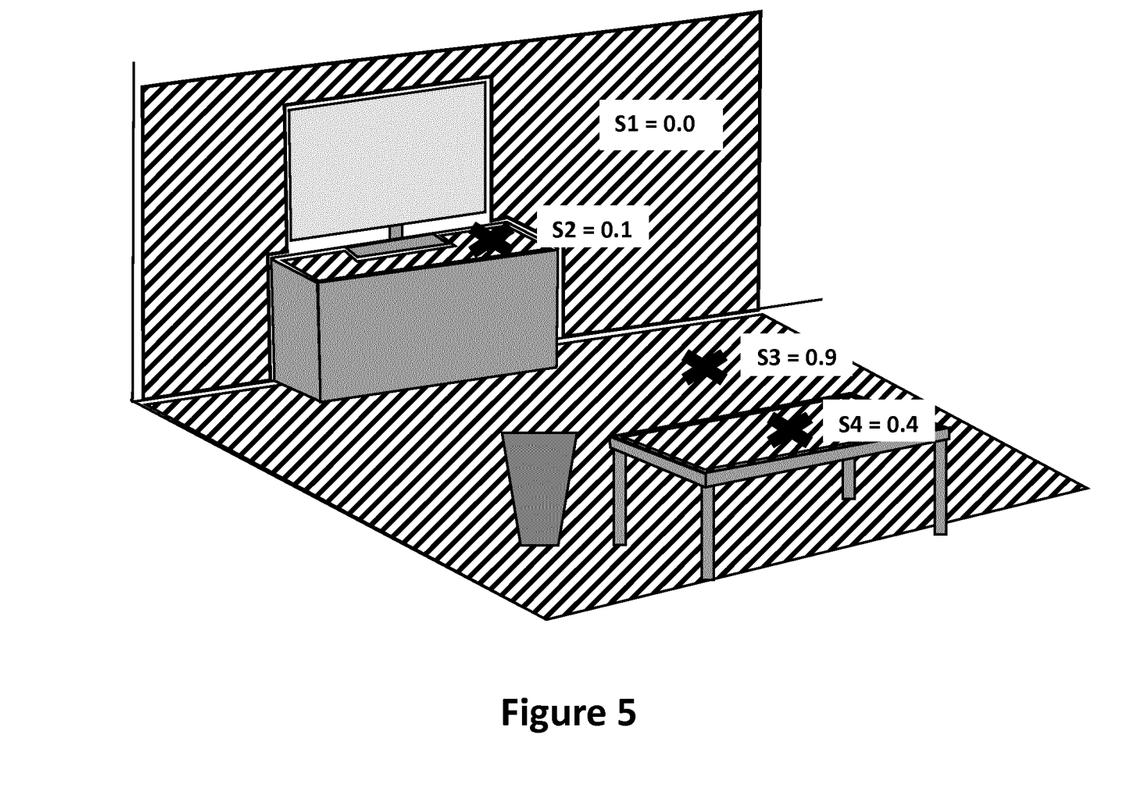
FIG. 5 illustrates the output of step 13 of FIG. 1, with the environment of FIG. 2.

FIG. 5 illustrates the output of step 13, with the environment of FIG. 2. The insertion points (black crosses) of the candidate insertion areas (31 to 34 in FIG. 3) are associated with a final compatibility score (S1 to S4), depending on the real-world 3D environment, the virtual object and the user position. For each insertion point, the final compatibility score is a weighted sum of virtual object-dependent measures computed during step 12, and user-dependent measures which are only computed during runtime (of the AR or MR application), just before the virtual object insertion. Any insertion point of area 31 has a score 0 because area 31 is not compatible with the virtual object. The insertion points of areas 32 and 34 have small scores because they require downscaling the virtual object. The selected insertion point of area 33 has the best score because area 33 is large enough and because it is visible from the user point of view. The two other insertion points of area 33 (one behind the vase 26 and the other below the table 24) have been discarded.

Step 14. Select best placement for the virtual object.

In a particular embodiment, step 14 comprises:
selecting the candidate insertion area (and corresponding insertion point) with the best score, along with the corresponding scale;
performing the insertion;
remove the selected insertion area from the list of candidate insertion areas (necessary if several virtual objects must be rendered simultaneously), replace it with a new one with updated delineation;
updating initial scores if necessary (in particular the distance to virtual objects).

When a virtual object is removed, the candidate insertion areas and scores should also be updated.

Figure 6:
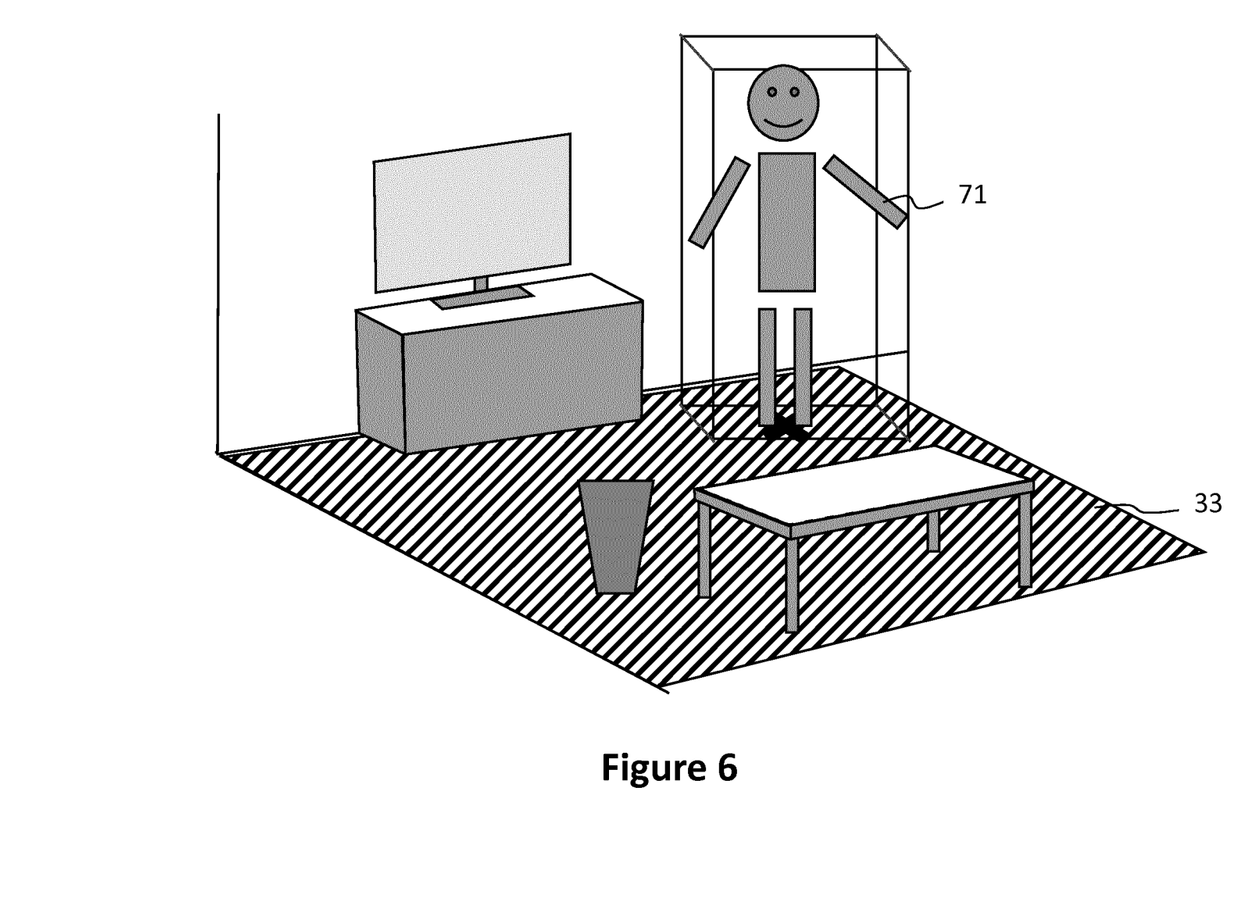
FIG. 6 illustrates the output of step 14 of FIG. 1, with the environment of FIG. 2.

FIG. 6 illustrates the output of step 14, with the environment of FIG. 2. The virtual object 71 is inserted at the best insertion point, which is the insertion point (black cross) of area 33.

In a particular embodiment, the steps 11 to 14 are executed for at least one further virtual object, in parallel with the execution for the aforesaid (first) virtual object at the runtime of the AR or MR application.

In other embodiments, at least one of the following complementary options is implemented:
conditional rendering: if the requirements cannot be fulfilled by any of the candidate insertion areas, then do not render (possibility to warn the user at launch if all initialization scores are equal to zero);
if the user is not happy with the selected insertion point and scale, he can go to the next proposal;
if the real-world 3D environment dynamically changes, then the candidate insertion areas and the initialization scores should be updated where it changes;
if the user moves in the real-world 3D environment, it is possible to change the insertion point (if authorized and needed by the application).

Figure 8:
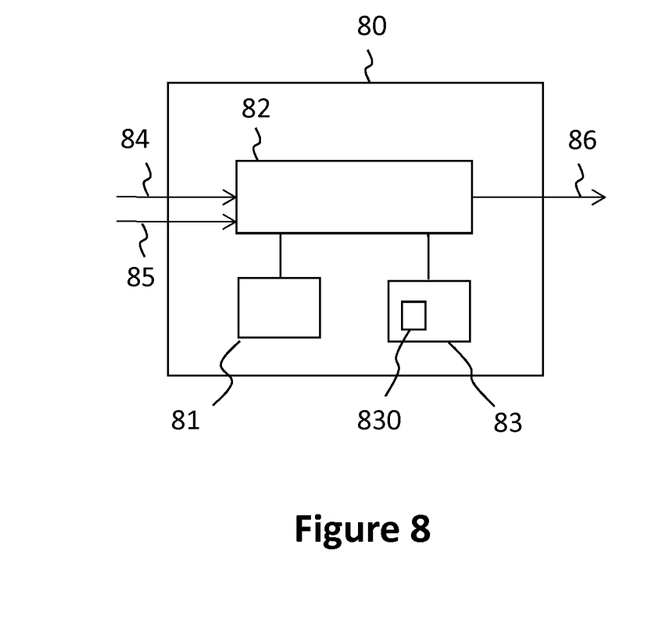
FIG. 8 shows the simplified structure of a device according to a particular embodiment.

FIG. 8 shows the simplified structure of a computing device 80 according to a particular embodiment. The device 80 comprises a non-volatile memory 83 (e.g. a read-only memory (ROM) or a hard disk), a volatile memory 81 (e.g. a random access memory or RAM) and a processor (computation machine) 82. The non-volatile memory 83 is a non-transitory computer-readable carrier medium. It stores executable program code instructions 830, which are executed by the processor 82 in order to enable implementation of the method described above. Upon initialization, the program code instructions 830 are transferred from the non-volatile memory 83 to the volatile memory 81 so as to be executed by the processor 82. The volatile memory 81 likewise includes registers for storing the variables and parameters required for this execution. The inputs comprise the virtual object 84 and the user position 85. The output 86 comprises the real-world 3D environment with the virtual object 71 inserted at the best insertion point.

All the steps of the method described above can be implemented by the device 80, equally well:
by the execution of a set of program code instructions executed by a reprogrammable computing machine such as a PC type apparatus, a DSP (digital signal processor) or a microcontroller. This set of program code instructions can be stored in a non-transitory computer-readable carrier medium that is detachable (for example a floppy disk, a CD-ROM or a DVD-ROM) or non-detachable; or by a dedicated computing machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it can also be implemented in hardware form or any form combining a hardware portion and a software portion.

The invention claimed is:

1. A method for a placement of a virtual object of an augmented or mixed reality application in a real-world 3D environment, the method comprising:
   determining, before a runtime of the augmented or mixed reality application, a set of at least two candidate insertion areas by pre-processing a capture of the real-world 3D environment;
   at the runtime, determining for each candidate insertion area:
      a first score for the real-world 3D environment,
      a second score for the virtual object considered with respect to a placement of the virtual object in the candidate insertion area,
      a third score for a user position, and
      a matching score as a weighted sum of the first, second and third scores, weights of the weighted sum being obtained, for the user before the runtime;
   selecting a candidate having a highest matching score in the set of candidate insertion areas; and
   inserting the virtual object in the selected candidate insertion area.

2. The method according to claim 1, further comprising:
   retrieving the candidate insertion areas from at least one storage unit; and
   outputting data on the inserting of the virtual object in the real-world environment for display,
   wherein the selecting of the one of the candidate insertion areas and the inserting of the virtual object are carried out by at least one processor.

3. The method according to claim 1,
   wherein the candidate insertion areas is associated with at least one insertion point,
   wherein the selecting of the one of the candidate insertion areas comprises selecting one of the insertion points of the candidate insertion areas,
   and wherein the inserting of the virtual object comprises inserting the virtual object at the selected insertion point in the selected candidate insertion area.

4. The method according to claim 1, further comprising, before the runtime, producing at least one of the criteria, relating to a geometric compatibility between the virtual object and the candidate insertion areas.

5. The method according to claim 1, wherein the second score is a function of a matching scale of the virtual object in the candidate insertion area.

6. The method according to claim 1,
   wherein a candidate insertion area is associated with at least one insertion point, and
   wherein the first score is a function of:
      at least one distance between the insertion point and a region of interest in the real-world 3D environment; and
      at least one distance between the insertion point and another virtual object already present in the real-world 3D environment.

7. The method according to claim 1,
   wherein a candidate insertion area is associated with at least one insertion point, and
   wherein the third score is a function of a distance between the insertion point and the user position.

8. The method according to claim 1, wherein the third score is a function of an overlap of the virtual object with respect to a current user field of view.

9. The method according to claim 1, wherein the-second score is a function of a size of the virtual object once rendered in the candidate insertion area, as derived from a maximum scaling of the virtual object in the candidate insertion area and from a distance between the user position and the virtual object as scaled in the candidate insertion area.

10. The method according to claim 1,
    wherein a candidate insertion areas is associated with at least one insertion point, and
    wherein the third score is a function of at least one of:
       a visibility from the user position of at least one region of interest after insertion of the virtual object in the candidate insertion area at the insertion point;
       a visibility from the user position of the virtual object after being inserted in the candidate insertion area at the insertion point; and
       a radiometry of a background as observed from the user position after insertion of the virtual object in the candidate insertion area at the insertion point.

11. The method according to claim 1, wherein the selecting and the inserting are executed for at least one further virtual object, in parallel with the execution for the virtual object at the runtime.

12. The method of claim 1, wherein the user position is relative to a user outside of the capture of the real-world 3D environment.

13. The method of claim 1, wherein one or more of the candidate insertion areas is a polygon.

14. A non-transitory, computer-readable medium storing program code instructions operative, when the program code instructions are executed on a computer or by a processor, to cause the computer or processor to:
    determine, before a runtime of an augmented or mixed reality application, a set of at least two candidate insertion areas by pre-processing a capture of a real-world 3D environment;
    at the runtime, determine for each candidate insertion area:
       a first score for the real-world 3D environment,
       a second score for the virtual object considered with respect to a placement of the virtual object in the candidate insertion area,
       a third score for a user position, and
       a matching score as a weighted sum of the first, second and third scores, weights of the weighted sum being obtained, for the user before the runtime;
    select a candidate having a highest matching score in the set of candidate insertion areas; and
    insert the virtual object in the selected candidate insertion area.

15. A device for a placement of a virtual object of an augmented or mixed reality application in a real-world 3D environment, the device comprising:

a processor; and a memory storing instructions operative, when executed by the processor, to cause the device to:

determine, before a runtime of an augmented or mixed reality application, a set of at least two candidate insertion areas by pre-processing a capture of a real-world 3D environment;

at the runtime, determine for each candidate insertion area:

a first score for the real-world 3D environment, a second score for the virtual object considered with respect to a placement of the virtual object in the candidate insertion area, a third score for a user position, and a matching score as a weighted sum of the first, second and third scores, weights of the weighted sum being obtained, for the user before the runtime;

select a candidate having a highest matching score in the set of candidate insertion areas; and insert the virtual object in the selected candidate insertion area.

16. The device according to claim 15, wherein a candidate insertion area are is associated with at least one insertion point, and wherein the first score is a function of at least one of:

at least one distance between the insertion point and a region of interest in the real-world 3D environment; and at least one distance between the insertion point and another virtual object already present in the real-world 3D environment.

* * * * *